United States Patent
Motohira

(10) Patent No.: US 12,036,880 B2
(45) Date of Patent: Jul. 16, 2024

(54) CONVERSION ADAPTER HAVING A CONNECTION PREVENTION MECHANISM

(71) Applicant: TOYOTA JIDOSHA KABUSHIKI KAISHA, Toyota (JP)

(72) Inventor: Akito Motohira, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 411 days.

(21) Appl. No.: 17/480,438

(22) Filed: Sep. 21, 2021

(65) Prior Publication Data

US 2022/0089048 A1    Mar. 24, 2022

(30) Foreign Application Priority Data

Sep. 23, 2020   (JP) .................................. 2020-158445

(51) Int. Cl.
*B60L 53/16*   (2019.01)
*B60L 53/18*   (2019.01)
*H01R 31/06*   (2006.01)
*H02J 7/00*    (2006.01)

(52) U.S. Cl.
CPC .............. *B60L 53/16* (2019.02); *B60L 53/18* (2019.02); *H01R 31/065* (2013.01); *H02J 7/0036* (2013.01); *B60L 2210/30* (2013.01)

(58) Field of Classification Search
CPC ............. B60L 2210/30; B60L 2210/40; H01R 31/065; H02J 7/0029; H02J 7/0036
See application file for complete search history.

(56) References Cited

U.S. PATENT DOCUMENTS

| 2015/0318809 | A1 | 11/2015 | Mitsutani |
| 2017/0368953 | A1* | 12/2017 | Zech ................. B60L 53/60 |
| 2022/0324341 | A1* | 10/2022 | Yu ................ H01R 13/6205 |

FOREIGN PATENT DOCUMENTS

| CN | 104379393 A | 2/2015 |
| FR | 3042072 A1 | 4/2017 |
| JP | 2017-229230 A | 12/2017 |
| WO | 2018220831 A1 | 12/2018 |

* cited by examiner

*Primary Examiner* — Abdullah A Riyami
*Assistant Examiner* — Amara Anderson
(74) *Attorney, Agent, or Firm* — Dinsmore & Shohl LLP

(57) ABSTRACT

A conversion adapter is configured to be connected between a charging cable extending from a charging station and an inlet included in a vehicle. The conversion adapter includes a cable connector configured to be connected to the charging cable, and a vehicle connector configured to be connected to the inlet. The cable connector includes: a power terminal that receives supply of a charging power from the charging station via the charging cable; and a lid and a lock device that are configured to mechanically prevent a connection between the power terminal and the charging cable. The lid and the lock device prevent the connection between the charging cable and the power terminal until the vehicle connector and the inlet are connected together, and removes prevention of the connection between the charging cable and the power terminal after the vehicle connector and the inlet are connected together.

5 Claims, 7 Drawing Sheets

CONVERSION ADAPTER HAVING A CONNECTION PREVENTION MECHANISM

CROSS REFERENCE TO RELATED APPLICATIONS

This nonprovisional application claims priority to Japanese Patent Application No. 2020-158445 filed on Sep. 23, 2020 with the Japan Patent Office, the entire content of which is hereby incorporated by reference.

BACKGROUND

Field

The present disclosure relates to a conversion adapter, and, more particularly, to a conversion adapter used for plug-in charging of a vehicle.

Description of the Background Art

Vehicles capable of plug-in charging are getting popular. For plug-in charging, a charging cable extending from charging equipment is connected to an inlet of a vehicle.

The charging cable and the inlet each have a shape according to the charging standard for the plug-in charging. However, in recent years, various charging standards exist. If the charging standard that the charging cable follows and the charging standard that the inlet follows are incompatible, the charging cable and the inlet are not connectable to each other. Thus, it is contemplated to connect a conversion adapter between the charging cable and the inlet, to ensure the compatibility between different charging standards. For example, the adapter disclosed in Japanese Patent Laying-Open No. 2017-229230 includes a CHAdeMO socket at the input and a CCS connector at the output.

SUMMARY

With a conversion adapter, the inventor has noted that problems can arise as follows. Prior to the start of plug-in charging, a user connects the charging cable to the inlet via the conversion adapter. Depending on the connection procedure followed by the user, a situation can take place in which the charging cable is connected to one end (the first end) of the conversion adapter, while the inlet is not connected to the other end (the second end) of the conversion adapter.

Although the charging cable of the charging equipment is connected to one end (the first end) of the conversion adapter, the charging equipment may erroneously determine that the charging cable is connected to the vehicle. It is also contemplated that the charging control may continue based on this wrong determination, while the other end (the second end) of the conversion adapter is exposed. As such, with the conversion adapter, an operation unintended by the user can take place.

The present disclosure is made to solve the above problem, and an object of the present disclosure is to prevent an operation unintended by the user when a conversion adapter is used to connect the charging cable of the charging equipment and the inlet of the vehicle via the conversion adapter.

(1) A conversion adapter according to a certain aspect of the present disclosure is configured to be connected between a charging cable extending from a charging equipment and an inlet included in a vehicle. The conversion adapter includes: a first end configured to be connected to the charging cable; and a second end configured to be connected to the inlet. The first end includes: a power terminal that receives a charging power supplied from the charging equipment via the charging cable; and a connection prevention mechanism configured to mechanically prevent a connection between the power terminal and the charging cable. The connection prevention mechanism prevents the connection between the power terminal and the charging cable when the second end and the inlet are disconnected from each other, and removes prevention of the connection between the power terminal and the charging cable when the second end and the inlet are connected together.

(2) The connection prevention mechanism includes: a lid that prevents the connection between the power terminal and the charging cable by covering the power terminal; and a lock device that locks the lid so that the power terminal is kept covered with the lid.

(3) The connection prevention mechanism includes: a movable pin that prevents the connection between the power terminal and the charging cable by preventing the power terminal and the charging cable from coming into contact with each other; and a drive device. The drive device switches between a first state and a second state by driving the movable pin, the first state being a state that allows the power terminal and the charging cable to come into contact, the second state being a state that prevents the power terminal and the charging cable from coming into contact with each other.

(4) The first end conforms to a first charging standard. The second end conforms to a second charging standard different from the first charging standard. The conversion adapter further comprises a signal converter that performs a signal conversion process between the first charging standard and the second charging standard.

(5) The conversion adapter further includes a controller which controls the connection prevention mechanism. The controller controls the connection prevention mechanism so that the connection prevention mechanism prevents the connection between the power terminal and the charging cable until the controller receives a detection signal indicating that connection between the second end and the inlet is sensed, and, in response to the detection signal, the connection prevention mechanism removes prevention of the connection between the power terminal and the charging cable.

In the configurations (1) to (5) above, the connection prevention mechanism keeps the first end not connectable, until the second end of the conversion adapter is connected to the inlet. In this way, by defining the connection order so that the second end is first connected and the first end is then connected, a situation can be prevented in which only the first end is connected to the charging equipment, and the second end is not connected to the inlet, leaving the second end exposed. Thus, with the configurations (1) to (5) above, an operation unintended by the user can be prevent. The foregoing and other objects, features, aspects and advantages of the present disclosure will become more apparent from the following detailed description of the present disclosure when taken in conjunction with the accompanying drawings.

DETAILED DESCRIPTION

Hereinafter, embodiments will be now described in detail, with reference to the accompanying drawings. Note that the same reference sign is used to refer to the same or like parts, and the description thereof will not be repeated.

Embodiment 1

<Overall Configuration of Charging System>

Figure 1:
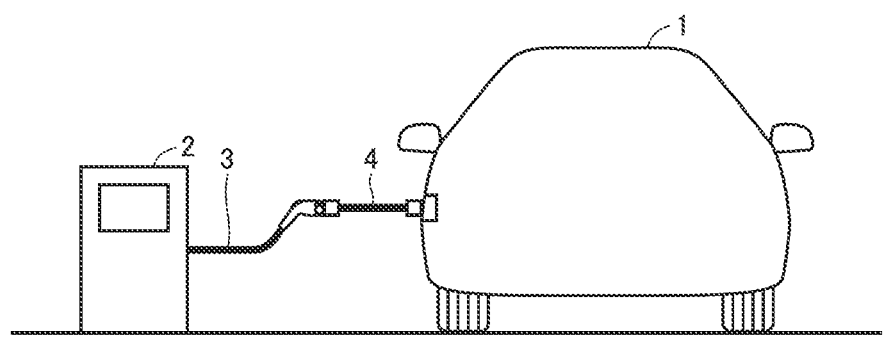
FIG. 1 is a diagram showing a situation in which plug-in charging is performed on a vehicle at a charging station, using a conversion adapter.

FIG. 1 is a diagram showing a situation in which plug-in charging is performed on a vehicle at a charging station, using a conversion adapter. Referring to FIG. 1, for the plug-in charging of a vehicle 1, the vehicle 1 and a charging station 2 are electrically connected together by a charging cable 3 and a conversion adapter 4.

The vehicle 1 is capable of plug-in charging, and, is, specifically, an electric vehicle (EV), a plug-in hybrid vehicle (PHV), a fuel cell vehicle (FCV), etc. The charging station (charging equipment) 2 is, for example, a public charging station provided at an outside-the-home location of the vehicle 1. A charging cable 3 extends from the charging station 2.

The vehicle 1 conforms to one charging standard for plug-in charging. The charging station 2 conforms to another charging standard for plug-in charging. There is no compatibility between the charging standard to which the vehicle 1 conforms, and the charging standard to which the charging station 2 conforms. For this reason, the vehicle 1 cannot be connected to the charging station 2 just by using the charging cable 3. Accordingly, the conversion adapter 4 is used for ensuring the compatibility between the two charging standards. With the conversion adapter 4, the vehicle 1 and the charging station 2 can be connected together via the charging cable 3, allowing an electric power to be supplied from the charging station 2 to the vehicle 1.

Figure 2:
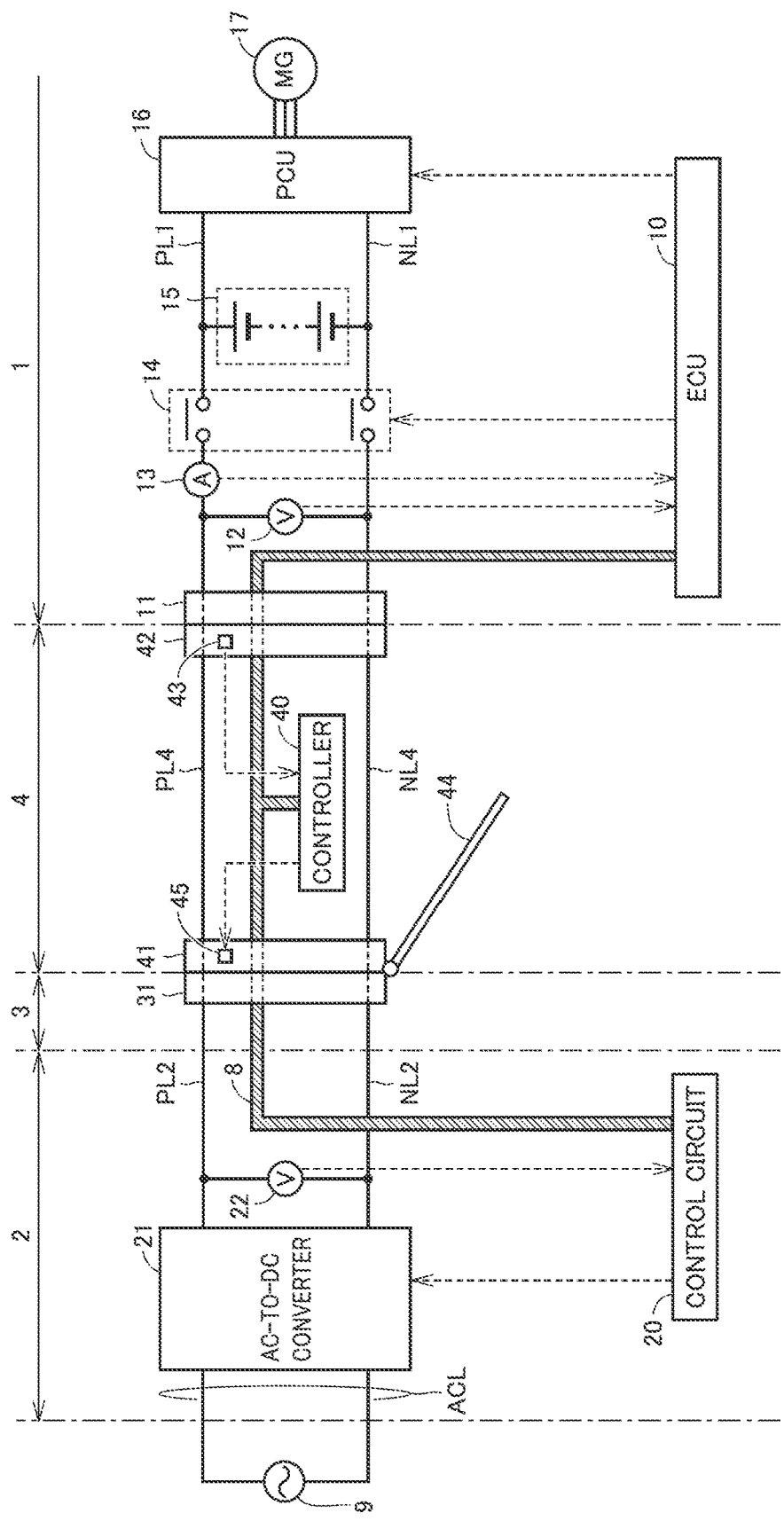
FIG. 2 is a block diagram schematically showing a configuration of a vehicle, a charging station, a charging cable, and a conversion adapter, according to Embodiment 1.

FIG. 2 is a block diagram schematically showing a configuration of the vehicle 1, the charging station 2, the charging cable 3, and the conversion adapter 4, according to Embodiment 1. Referring to FIG. 2, the vehicle 1 is an electric vehicle in this example. The vehicle 1 includes an inlet 11, a voltage sensor 12, a current sensor 13, a relay 14, a battery 15, a power control unit (PCU) 16, a motor generator 17, an electronic control unit (ECU) 10, and power lines PL1 and NL1.

Normally, such as the plug-in charging of the vehicle 1 at the user's home, the inlet (also called a charging port) 11 can be connected to a charging cable (not shown) at home. In the example in FIG. 2, however, the plug-in charging of the vehicle 1 is performed at an outside-the-home location, and the charging connector 31 at the tip of the charging cable 3 cannot be connected to the inlet 11. Accordingly, the conversion adapter 4 is connected between the inlet 11 and the charging connector 31. The inlet 11 and the charging connector 31 are connected via the conversion adapter 4, thereby ensuring electrical connection between the vehicle 1 and the charging station 2. This also allows the ECU 10 of the vehicle 1 and a control circuit 20 (described below) of the charging station 2 to exchange various signals (a command and/or data) via a control line 8.

The voltage sensor 12 detects a direct-current (DC) voltage between the power line PL1 and the power line NL1, and outputs a result of the detection to the ECU 10. The current sensor 13 detects the current flowing through the power line PL1, and outputs a result of the detection to the ECU 10. Based on the results of the detections by the voltage sensor 12 and the current sensor 13, the ECU 10 can calculate an electric power supplied from the charging station 2.

The relay 14 is electrically connected to the power lines PL1 and NL1, between the inlet 11 and the battery 15. The relay 14 is opened/closed in response to a control command from the ECU 10. As the relay 14 is closed, the transmission of an electric power from the inlet 11 to the battery 15 is enabled.

The battery 15 supplies an electric power for generating a driving force for the vehicle 1. The battery 15 also stores an electric power generated by the motor generator 17. The battery 15 is an assembled battery formed of multiple cells (not shown). Each cell may be a liquid secondary battery, such as a lithium-ion battery or a nickel-hydrogen battery, or an all-solid-state battery.

The PCU 16 includes a converter and an inverter (none of which are shown), and performs bidirectional power conversion between the battery 15 and the motor generator 17.

The motor generator 17 is, for example, a three-phase alternating-current (AC) rotating electric machine. The motor generator 17 uses an electric power, generated by the battery 15, to rotate the drive shaft (not shown). The motor generator 17 is also capable of generating power by regenerative braking. The AC power generated by the motor generator 17 is converted into a DC power by the PCU 16 and stored in the battery 15.

The ECU 10 includes a processor, such as a central processing unit (CPU), a memory, such as a read only memory (ROM) and a random access memory (RAM), and input/output ports (none of which are shown). In response to the signals from the sensors, the ECU 10 controls the devices so that the vehicle 1 is brought into a desired state. Specifically, the ECU 10 transmits/receives the signals to/from the control circuit 20 of the charging station 2 via the charging cable 3 and the conversion adapter 4, thereby performing a plug-in charging control.

The charging station 2 is a charger for a direct-current charging (what is called, fast charging) in this example. The charging station 2 converts the AC power from a system power supply 9 into a DC power for charging the battery 15 mounted on the vehicle 1, and supplies the DC power. The charging station 2 includes a power line ACL, an AC-to-DC converter 21, a voltage sensor 22, electric supply lines PL2 and NL2, and a control circuit 20.

The power line ACL is electrically connected to the system power supply 9. The power line ACL transfers the AC power from the system power supply 9 to the AC-to-DC converter 21.

The AC-to-DC converter 21 converts the AC power on the power line ACL into an DC power for charging the battery 15 of the vehicle 1. The power conversion performed by the AC-to-DC converter 21 may be a combination of AC-to-DC conversion for improving the power factor and DC-to-DC conversion for adjusting the voltage level. The DC power output from the AC-to-DC converter 21 is supplied to the electric supply lines PL2 and NL2.

The voltage sensor 22 detects the voltage between the electric supply line PL2 and the electric supply line NL2, and outputs a result of the detection to the control circuit 20.

As with the ECU 10 of the vehicle 1, the control circuit 20 includes a processor, a memory, and input/output ports (none of which are shown). The control circuit 20 controls the power conversion operation performed by the AC-to-DC converter 21, based on the voltage detected by the voltage sensor 22, the signals from the various switches and the vehicle 1, and maps and programs stored in the memory.

The conversion adapter 4 includes a cable connector 41, a vehicle connector 42, a detection switch 43, a lid 44, a lock device 45, power lines PL4 and NL4, and a controller 40.

The cable connector 41 is mechanically connectable to the charging connector 31 of the charging cable 3. The vehicle connector 42 is mechanically connectable to the inlet 11 of the vehicle 1. Note that the cable connector 41 corresponds to "a first end" according to the present disclosure, and the vehicle connector 42 corresponds to "a second end" according to the present disclosure.

As the vehicle connector 42 and the inlet 11 are connected, the detection switch 43 outputs to the controller 40 a detection signal indicating that the vehicle connector 42 and the inlet 11 are connected together. However, the source from which the detection signal is generated is not limited to the detection switch 43, and a detection signal generated by the vehicle 1 may be transmitted from the vehicle 1 to the controller 40.

As with the ECU 10 of the vehicle 1 and the control circuit 20 of the charging station 2, the controller 40 includes a processor, a memory, and input/output ports (none of which are shown). Based on a detection signal from the detection switch 43, the controller 40 determines whether the vehicle connector 42 and the inlet 11 are connected together.

The controller 40 is also connected to a control line 8, and can transmit/receive various signals to/from the ECU 10 and the control circuit 20 via the control line 8. The controller 40 is further capable of performing various processes according to the charging standard which the vehicle 1 conforms to and the charging standard which the charging station 2 conforms to. For example, the controller 40 can convert the signal from the vehicle 1 so that the signal follows the charging standard which the charging station 2 conforms to, and transmit the signal subjected to the conversion process to the charging station 2. Conversely, the controller 40 can convert the signal from the charging station 2 so that the signal follows the charging standard which the vehicle 1 conforms to, and transmit the signal subjected to the conversion process to the vehicle 1. With this, the controller 40 can ensure the compatibility between the vehicle 1 and the charging station 2, and provide a bridge for the charging control therebetween.

Note that the controller 40 can operate with, for example, an electric power supplied from a small battery (not shown) built in the conversion adapter 4. The controller 40 may operate with an electric power that is supplied from the vehicle 1 and/or the charging station 2 via the control line 8 (or a power supply line not shown).

The inventor has noted that the following problems can occur in the charging system as described above. In order to start the plug-in charging, a user connects the charging connector 31 of the charging cable 3 and the inlet 11 of the vehicle 1 via the conversion adapter 4. Depending on the connection procedure by the user at this time, a situation can take place in which the charging connector 31 of the charging cable 3 and the cable connector 41 of the conversion adapter 4 are connected together, whereas the inlet 11 of the vehicle 1 and the vehicle connector 42 of the conversion adapter 4 are not connected together. The charging station 2 may erroneously determine this situation as the charging cable 3 and the vehicle 1 being connected together. Based on this false determination, the charging station 2 may also initiate the plug-in charging control although the vehicle connector 42 is kept exposed. As such, an operation unintended by the user can occur when connecting the charging connector 31 of the charging cable 3 and the inlet 11 of the vehicle 1 using the conversion adapter 4.

Thus, in the present embodiment, a configuration is employed for the conversion adapter 4 in which configuration the lid 44 and the lock device 45 are additionally provided. The controller 40 uses the lock device 45 to control opening/closing of the lid 44. This can avoid exposure of the vehicle connector 42, and prevent an operation unintended by the user, as described in detail.

<Configuration of Conversion Adapter>

Figure 3:
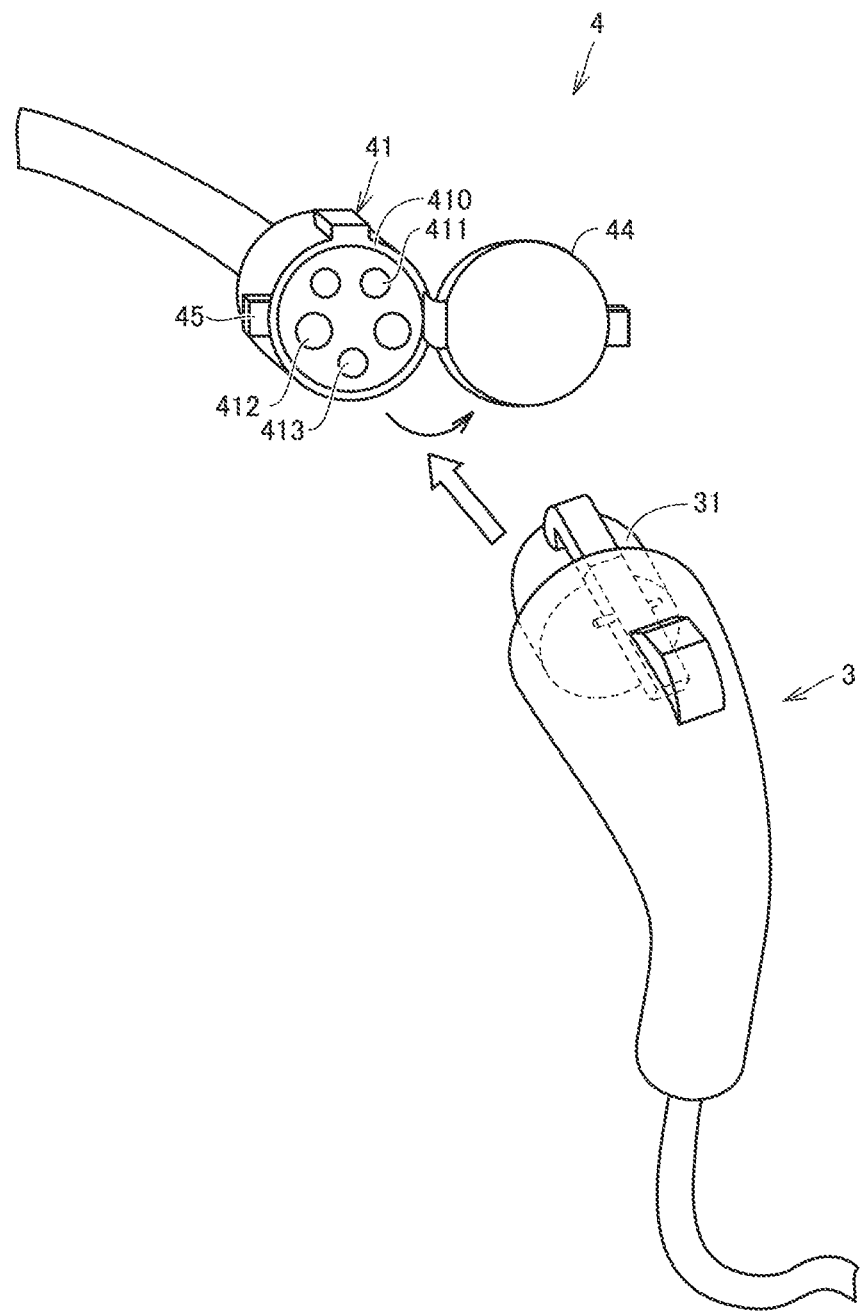
FIG. 3 is a perspective view schematically showing a configuration of a charging cable and a cable connector, according to Embodiment 1.

FIG. 3 is a perspective view schematically showing a configuration of the charging cable 3 and the cable connector 41, according to Embodiment 1. Referring to FIGS. 2 and 3, the cable connector 41 of the conversion adapter 4 includes: a cylindrical portion 410 formed to fit into the charging connector 31 of the charging cable 3; and multiple terminals accommodated within the cylindrical portion 410. In the example of FIG. 3, the terminals include: a communications terminal 411 for exchanging signals; a power terminal 412 for receiving the charging power; and a ground terminal 413 for grounding. However, the type or the number of terminals disposed in the cylindrical portion 410 are not particularly limited.

The lid 44 has a shape (in this example, a circular shape) similar to the opening of the cylindrical portion 410, and is configured to cover the opening of the cylindrical portion 410. While the opening of the cylindrical portion 410 is not covered with the lid 44, the respective terminals (the communications terminal 411, the power terminal 412, and the ground terminal 413) are externally exposed. While the opening of the cylindrical portion 410 is covered with the lid 44, in contrast, the terminals are completely hidden from the outside of the conversion adapter 4. Note that the lid 44 may be called a cover.

The lock device 45 includes an engagement unit, for example, on the outer periphery of the cylindrical portion 410, and allows the lid 44 to be locked with the opening of the cylindrical portion 410 covered with the lid 44. The lock device 45 can also be unlocked (the lock is released), in accordance with a control command from the controller 40. The user is unable to open the lid 44 while the lock device 45 is locked, and thus is unable also to connect the cable connector 41 and the charging connector 31 together. As the lock device 45 is unlocked, the user is able to open the lid 44, and connect the cable connector 41 and the charging connector 31 together.

If the controller 40 receives no detection signal indicating that the vehicle connector 42 and the inlet 11 are connected, the controller 40 keeps the lock device 45 locked. Doing so keeps the opening of the cylindrical portion 410 covered with the lid 44, hiding the terminals from the outside of the conversion adapter 4. Thus, the user is unable to plug the charging connector 31 into the cable connector 41. If the controller 40 receives a detection signal, the controller 40 unlocks the lock device 45. This allows the user to open the lid 44 covering the opening of the cylindrical portion 410 and plug the charging connector 31 into the cable connector 41.

By the controller 40 controlling the lid 44 and the lock device 45 as such in accordance with a detection signal, the connection order of the connectors (the cable connector 41 and the vehicle connector 42) at the opposing ends of the conversion adapter 4, can be uniquely defined. Specifically, the connection order, first from the cable connector 41 and then the vehicle connector 42, cannot be allowed, and only the connection order, first from the vehicle connector 42 and then the cable connector 41, can be allowed.

If the order of connections of the vehicle connector 42 and then the cable connector 41 is allowed, the cable connector 41 is kept covered with the lid 44 and not connected to the charging connector 31, until the vehicle connector 42 and the inlet 11 are connected. In other words, while the vehicle 1 and the conversion adapter 4 are electrically connected, the charging station 2 and the conversion adapter 4 are electrically disconnected. Accordingly, exposure of the power terminal 412 can be avoided during the plug-in charging control by the charging station 2. Thus, an operation unintended by the user can be prevented.

<Control Flow>

Figure 4:
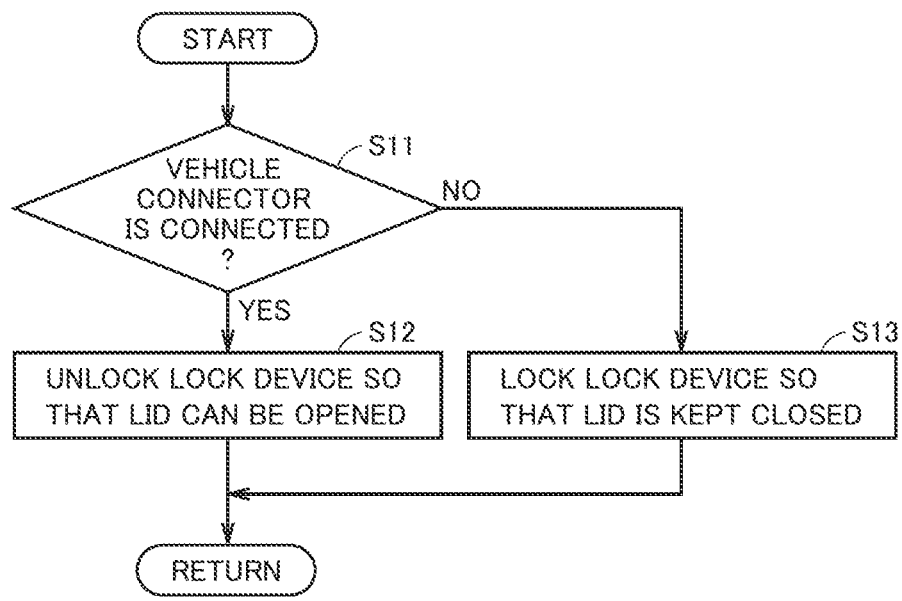
FIG. 4 is a flowchart illustrating a control performed by the conversion adapter, according to Embodiment 1.

FIG. 4 is a flowchart illustrating a control performed by the conversion adapter 4, according to Embodiment 1. While the controller 40 is activated, the processes included in the flowchart are repeated for every predetermined period, for example. Each process step is implemented by software processing by the controller 40. However, each process step may be implemented by hardware (an electric circuit) created within the controller 40. The same is true for the flowchart of FIG. 7 described later. Hereinafter, each process step is abbreviated as S.

Referring to FIG. 4, in S11, the controller 40 determines whether the vehicle connector 42 is connected to the inlet 11, based on a detection signal from the detection switch 43. The controller 40 determines that the vehicle connector 42 is connected to the inlet 11 if the controller 40 receives a detection signal from the detection switch 43. The controller 40 determines that the vehicle connector 42 is not connected to the inlet 11 if the controller 40 receives no detection signal from the detection switch 43.

If the vehicle connector 42 is not connected to the inlet 11 (NO in S11), the controller 40 locks the lock device 45 so that the cable connector 41 is kept covered (closed) with the lid 44 (S13). In contrast, if the vehicle connector 42 and the inlet 11 are connected (YES in S11), the controller 40 unlocks the lock device 45 so that the user can open the lid 44 and plug the charging connector 31 of the charging cable 3 into the cable connector 41 (S12).

As described above, in Embodiment 1, the cable connector 41 is kept covered with the lid 44 until the vehicle connector 42 is connected to the inlet 11 of the vehicle 1. In this way, by defining the connection order of the cable connector 41 and the vehicle connector 42 at the opposing ends of the conversion adapter 4 so that the vehicle connector 42 is first connected and the cable connector 41 is then connected, a situation can be prevented in which the cable connector 41 is connected to the charging station 2 whereas the vehicle connector 42 is not connected to the inlet 11, leaving the vehicle connector 42 exposed. Thus, according to Embodiment 1, an operation unintended by the user using the conversion adapter 4 can be prevented.

Embodiment 2

Embodiment 1 has been described with reference to providing the conversion adapter 4 with the mechanisms, including the lid 44 and the lock device 45. However, the configuration of the mechanisms added to the conversion adapter is not limited thereto, insofar as the connection order of the connectors at the opposing ends of the conversion adapter 4 can be uniquely defined. Embodiment 2 is now described with reference to a movable pin as an additional element to the conversion adapter.

Figure 5:
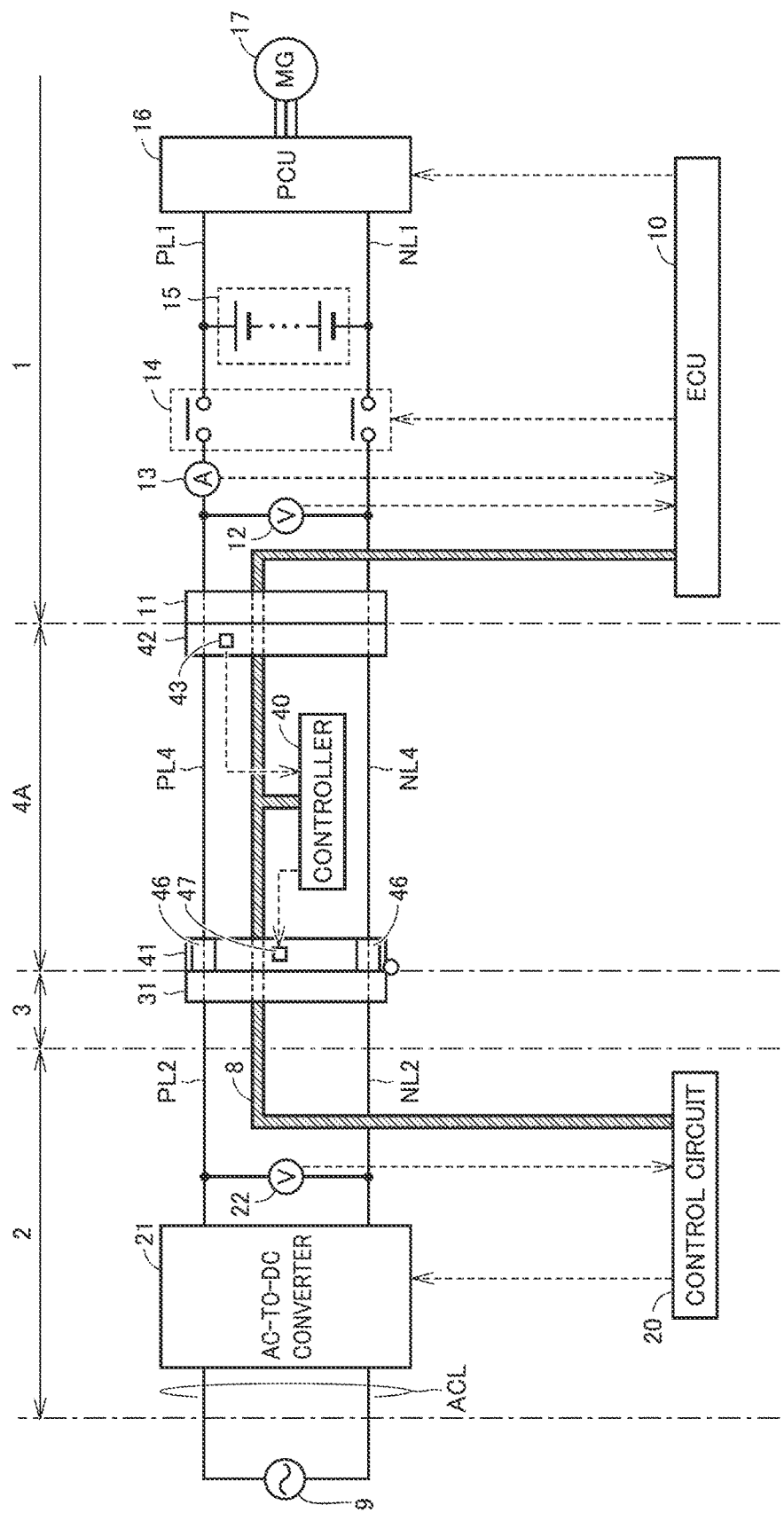
FIG. 5 is a block diagram schematically showing a configuration of a vehicle, a charging station, a charging cable, and a conversion adapter, according to Embodiment 2.

FIG. 5 is a block diagram schematically showing a configuration of a vehicle, a charging station, a charging cable, and a conversion adapter, according to Embodiment 2. Referring to FIG. 5, a conversion adapter 4A differs from the conversion adapter 4 according to Embodiment 1 (see FIG. 2) in that the conversion adapter 4A includes movable pins 46 and a drive device 47, in addition to a lid 44 and a lock device 45. The vehicle 1, a charging station 2, and a charging cable 3 each have the same configuration as a corresponding configuration according to Embodiment 1, and thus the description thereof will not be repeated.

Figure 6:
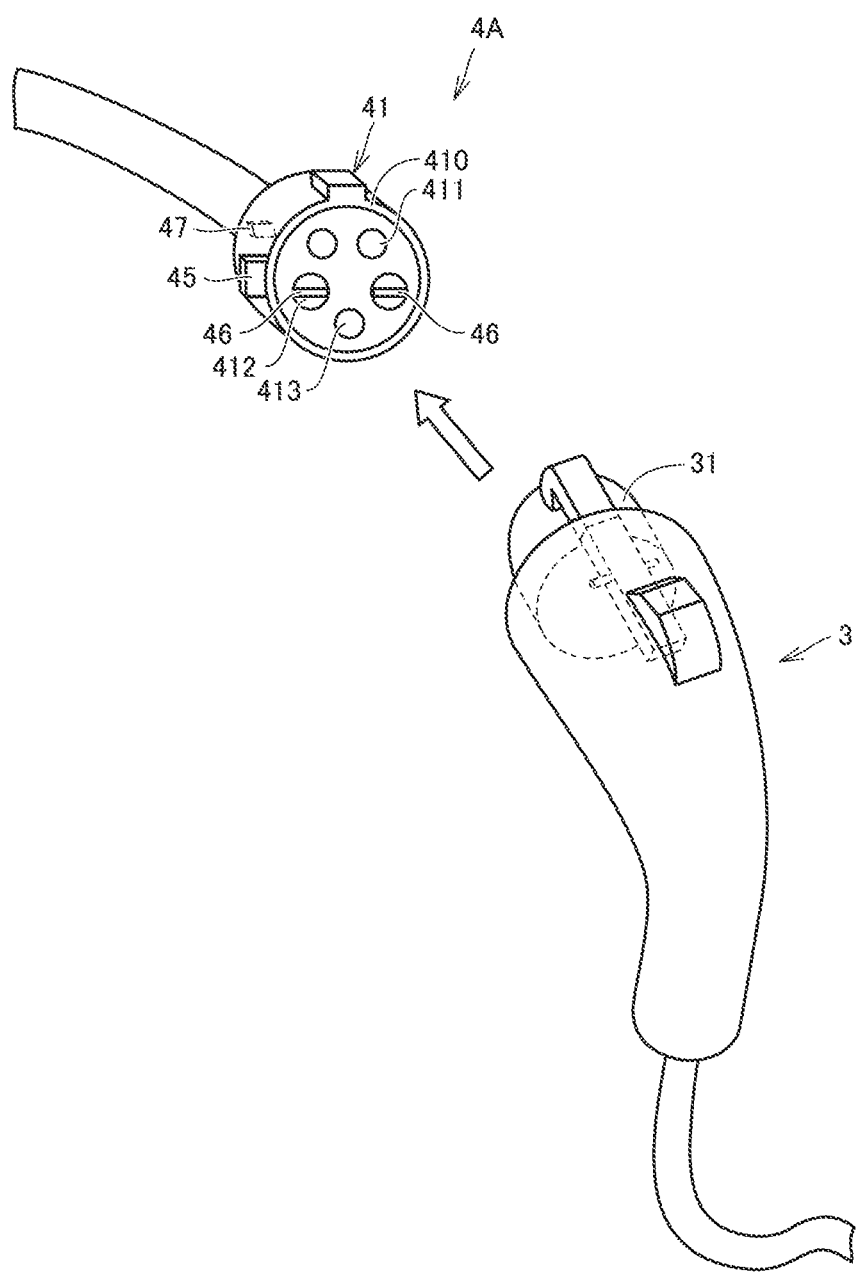
FIG. 6 is a perspective view schematically showing a configuration of the charging cable and the cable connector, according to Embodiment 2.

FIG. 6 is a perspective view schematically showing a configuration of the charging cable 3 and a cable connector 41, according to Embodiment 2. Referring to FIGS. 5 and 6, movable pins 46 are provided at the two power terminals 412 disposed in a cylindrical portion 410 of the cable connector 41. The movable pins 46 are configured to extend or retreat. The drive device 47 drives the movable pins 46, in accordance with a control command from the controller 40, to switch between extending the movable pins 46 and retreating the movable pins 46.

When the movable pins 46 are retreated, a user can plug the charging connector 31 of the charging cable 3 into the cylindrical portion 410 of the cable connector 41. In this situation, on the other hand, there is no denying the possibility that a foreign object comes into contact with the power terminal 412. While the movable pins 46 are extended, in contrast, ingress of a foreign object into the power terminal 412 is blocked by the movable pins 46, thereby preventing a foreign object from coming into contact with the power terminal 412. At this time, the user is unable to plug the charging connector 31 of the charging cable 3 into the cylindrical portion 410 of the cable connector 41.

Figure 7:
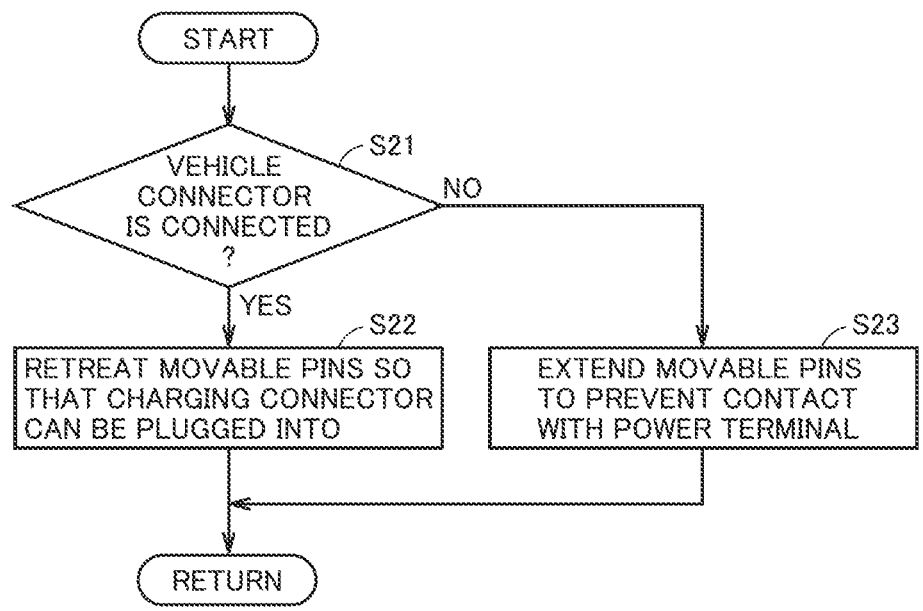
FIG. 7 is a flowchart illustrating a control performed by the conversion adapter, according to Embodiment 2.

FIG. 7 is a flowchart illustrating a control performed by the conversion adapter 4A according to Embodiment 2. Referring to FIG. 7, the process of S21 is the same as the process of S11 according to Embodiment 1 (see FIG. 4).

If a vehicle connector 42 and an inlet 11 are not connected together (NO in S21), the controller 40 extends the movable pins 46 (S23), in order to prevent a foreign object from coming into contact with the power terminal 412. In contrast, if the vehicle connector 42 and the inlet 11 are connected together (YES in S21), the controller 40 retreats the movable pins 46 (S22) so that the user can plug into the cable connector 41 the charging connector 31 at the tip of the charging cable 3.

As described above, in Embodiment 2, the movable pins 46 are extended until the vehicle connector 42 is connected to the inlet 11, thereby preventing the charging connector 31 of the charging cable 3 from being plugged into the cable connector 41. This can prevent a foreign object from coming into contact with the power terminal 412. As the vehicle connector 42 is connected to the inlet 11, the movable pins 46 are retracted so that the charging connector 31 can be plugged into the cable connector 41. In this way, also in Embodiment 2, by defining the connection order of the connectors of the conversion adapter 4A so that the vehicle connector 42 is first connected, and the cable connector 41 is then connected, a situation can be avoided in which the cable connector 41 is connected to the charging station 2 while the vehicle connector 42 is not connected to the inlet 11, leaving the vehicle connector 42 exposed. Thus, Embodiment 2 can also prevent an operation unintended by the user when using a conversion adapter 4A.

Note that, in Embodiment 1, the lid 44 and the lock device 45 correspond to a "connection prevention mechanism" according to the present disclosure. In Embodiment 2, the movable pins 46 and the drive device 47 correspond to the "connection prevention mechanism" according to the present disclosure. The controller 40 corresponds to both a "signal converter" and a "controller" according to the present disclosure. However, the "signal converter" and the "controller" according to the present disclosure may be separate components.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A conversion adapter configured to be connected between a charging cable extending from a charging equipment and an inlet included in a vehicle, the conversion adapter comprising:
 a first end configured to be connected to the charging cable; and
 a second end configured to be connected to the inlet, wherein
 the first end includes:
 a power terminal that receives a charging power supplied from the charging equipment via the charging cable; and
 a connection prevention mechanism configured to mechanically prevent a connection between the power terminal and the charging cable,
 the connection prevention mechanism
 prevents the connection between the power terminal and the charging cable when the second end and the inlet are disconnected from each other, and removes prevention of the connection between the power terminal and the charging cable when the second end and the inlet are connected together.

2. The conversion adapter according to claim 1, wherein the connection prevention mechanism includes:
 a lid that prevents the connection between the power terminal and the charging cable by covering the power terminal; and
 a lock device that locks the lid so that the power terminal is kept covered with the lid.

3. The conversion adapter according to claim 1, wherein the connection prevention mechanism includes:
 a movable pin that prevents the connection between the power terminal and the charging cable by preventing the power terminal and the charging cable from coming into contact with each other; and
 a drive device that switches between a first state and a second state by driving the movable pin, the first state being a state that allows the power terminal and the charging cable to come into contact, the second state being a state that prevents the power terminal and the charging cable from coming into contact with each other.

4. The conversion adapter according to claim 1, wherein the first end conforms to a first charging standard,
 the second end conforms to a second charging standard different from the first charging standard, and
 the conversion adapter further comprises a signal converter that performs a signal conversion process between the first charging standard and the second charging standard.

5. The conversion adapter according to claim 1, further comprising
 a controller that controls the connection prevention mechanism, wherein
 the controller controls the connection prevention mechanism so that the connection prevention mechanism prevents the connection between the power terminal and the charging cable until the controller receives a detection signal indicating that connection between the second end and the inlet is sensed, and, in response to the detection signal, the connection prevention mechanism removes prevention of the connection between the power terminal and the charging cable.

* * * * *